(12) United States Patent
Nakazawa et al.

(10) Patent No.: US 7,377,166 B2
(45) Date of Patent: May 27, 2008

(54) SENSOR SIGNAL PROCESSING SYSTEM AND DETECTOR

(75) Inventors: Fumihiko Nakazawa, Kawasaki (JP); Masanori Yachi, Yokohama (JP); Toshio Hanazawa, Yokohama (JP)

(73) Assignees: Fujitsu Limited, Kawasaki (JP); Fujitsu Media Devices Limited, Yokohama (JP)

( * ) Notice: Subject to any disclaimer, the term of this patent is extended or adjusted under 35 U.S.C. 154(b) by 0 days.

(21) Appl. No.: 11/412,779

(22) Filed: Apr. 28, 2006

(65) Prior Publication Data

US 2007/0175276 A1 Aug. 2, 2007

(30) Foreign Application Priority Data

Jan. 31, 2006 (JP) .............................. 2006-023616

(51) Int. Cl.
*G01P 3/00* (2006.01)

(52) U.S. Cl. ...................................... 73/497

(58) Field of Classification Search ................. 73/497, 73/504.04, 504.12, 504.13, 504.14, 504.15, 73/504.16, 504.02
See application file for complete search history.

(56) References Cited

U.S. PATENT DOCUMENTS

| | | | | |
|---|---|---|---|---|
| 3,956,927 A | * | 5/1976 | Pearson | ........................ 73/766 |
| 4,576,052 A | * | 3/1986 | Sugiyama | ................. 73/862.68 |
| 5,349,855 A | | 9/1994 | Bernstein et al. | |
| 5,635,787 A | | 6/1997 | Mori et al. | |
| 5,777,737 A | * | 7/1998 | Priest | .......................... 356/466 |
| 5,821,807 A | * | 10/1998 | Brooks | ........................ 327/540 |
| 5,854,428 A | | 12/1998 | Okaguchi | |
| 6,853,237 B2 | * | 2/2005 | Murakami et al. | ........... 327/512 |
| 7,069,783 B2 | * | 7/2006 | Uehara | ..................... 73/514.12 |
| 2002/0017134 A1 | | 2/2002 | Sakurai et al. | |

FOREIGN PATENT DOCUMENTS

| | | |
|---|---|---|
| JP | 5-302833 | 11/1993 |
| JP | 11-142160 | 5/1999 |
| JP | 11-148829 | 6/1999 |
| JP | 2002-372422 | 12/2002 |
| JP | 2003-247828 | 9/2003 |

OTHER PUBLICATIONS

European Search Report, dated Aug. 6, 2007, for related European Patent Application No. 06 25 2011.

* cited by examiner

*Primary Examiner*—Helen C. Kwok
(74) *Attorney, Agent, or Firm*—Staas & Halsey LLP

(57) ABSTRACT

A detector is made up of a semiconductor integrated circuit in a part, and the semiconductor integrated circuit includes a driving circuit, an AC amplifier, a detection circuit and an amplifier circuit. An input resistor that is connected to input terminals of an operational amplifier includes an internal input resistor made up of a semiconductor integrated circuit element and an external input resistor made up of an external discrete component connected to each other in parallel. Temperature characteristics of an angular velocity sensor is compensated by a temperature coefficient ($\alpha 3$) that is a combination of a temperature coefficient ($\alpha 1$) of the internal input resistor and a temperature coefficient ($\alpha 2$) of the external input resistor.

8 Claims, 8 Drawing Sheets

SENSOR SIGNAL PROCESSING SYSTEM AND DETECTOR

BACKGROUND OF THE INVENTION

1. Field of the Invention

The present invention relates to a sensor signal processing system for processing an output signal of an angular velocity sensor (angular accelerometer) or the like for producing a detection signal that corresponds to a physical phenomenon and relates to a detector that is used for the system.

2. Description of the Prior Art

Conventionally, an angular velocity sensor (an angular accelerometer, also called a gyro sensor) for detecting an angular velocity of an object has been used for detection of shake or movement of a video camera, a navigation device, detection of a roll angle for determining a release timing of side air bags, or an attitude control of a vehicle or a robot.

Such an angular velocity sensor includes a beam type and a tuning fork type. Among those types, a tuning fork gyro sensor is widely used because it can be vibrated easily and has a high Q value (see patent documents 1-3 below).

The tuning fork gyro sensor has a structure including a substrate of a tuning fork (an oscillator) having a plurality of arm portions and a base portion (node portion) made of a piezoelectric material such as a lithium niobate (LN) and a plurality of electrodes for drive and detection that are disposed on front, rear and side faces.

This angular velocity sensor has sensitivity that varies in accordance with temperature. For example, an LN gyro sensor made of a piezoelectric material such as a lithium niobate (LN) has sensitivity-temperature characteristics as shown in FIG. 8, in which the sensitivity decreases as the temperature rises. The sensitivity-temperature characteristics in the example shown in FIG. 8 have a rate of approximately −1100 ppm/° C.

In order to compensate such sensitivity-temperature characteristics of the angular velocity sensor, various countermeasures have been adopted. For example, the patent document 1 below discloses a method of a conventional technique, in which, with respect to an angular velocity sensor, discrete correction data of sensitivity to temperature is memorized, and the correction data that correspond to a temperature detected by a temperature sensor in the vicinity of the angular velocity sensor are read out for performing the correction. However, this method has some disadvantages in that it is difficult to perform consecutive corrections and that it is troublesome to obtain the correction data in advance and that a system configuration becomes complicated.

In addition, the patent document 3 proposes a method for a semiconductor integrated circuit that constitutes a detection circuit (a detector). In this method, an internal resistor having some temperature characteristics and an external resistor having little temperature characteristics are used respectively as an input resistor and an output resistor of a differential amplifier circuit, so that an amplification factor of the amplifier circuit has temperature characteristics. Thus, the sensitivity-temperature characteristics of the angular velocity sensor can be cancelled.

[Patent Document 1] Japanese unexamined patent publication No. 2002-372422

[Patent Document 2] Japanese unexamined patent publication No. 2003-247828

[Patent Document 3] Japanese unexamined patent publication No. 11-148829

However, the conventional method proposed in the above-mentioned patent document 3 has a disadvantage in that temperature-gain characteristics of an amplifier circuit in a semiconductor integrated circuit are determined uniquely by temperature characteristics of an internal resistance.

On the other hand, sensitivity-temperature characteristics of an angular velocity sensor may alter in accordance with a variation or a lot number of a manufacturing process or are changed along with a design change of the angular velocity sensor.

Therefore, in order to enable the similar compensation for each of the angular velocity sensors, it is necessary to revise the semiconductor integrated circuit so as to change specifications of the detection circuit responding to the change of the sensitivity-temperature characteristics. However, designing and manufacturing a semiconductor integrated circuit takes a long time and needs high cost, so this method is not good in flexibility.

In addition, if the sensitivity-temperature characteristics have a large ratio, it is necessary to use a large correction coefficient of the temperature characteristics corresponding thereto. Therefore, it is necessary to use a multistage amplifier circuit, which causes a large scale of circuit and a higher cost of manufacturing the semiconductor integrated circuit.

SUMMARY OF THE INVENTION

An object of the present invention is to provide a sensor signal processing system having a simple configuration for compensating temperature characteristics of an angular velocity sensor or the like responding to a change of the sensitivity-temperature characteristics thereof and to provide a detector that is used for the system.

Another object of the present invention is to enlarge a correction coefficient of the temperature characteristics without increasing a scale of a circuit.

According to one aspect of the present invention, a sensor signal processing system includes a sensor and a detector for processing an output signal from the sensor so as to output a detection signal that corresponds to a physical phenomenon. At least a part of the detector is made up of a semiconductor integrated circuit, the semiconductor integrated circuit includes an amplifier circuit that utilizes an operational amplifier made up of a semiconductor integrated circuit element, an input resistor that is connected to an input terminal of the operational amplifier includes an internal input resistor made up of the semiconductor integrated circuit element and an external input resistor disposed outside the semiconductor integrated circuit and connected to the internal input resistor in parallel, and sensitivity-temperature characteristics of the sensor are compensated by temperature characteristics that are combination of temperature characteristics of the internal input resistor and temperature characteristics of the external input resistor.

Preferably, a feedback resistor is connected between an output terminal and the input terminal of the operational amplifier and is disposed outside the semiconductor integrated circuit, and a resistance of the feedback resistor is set in accordance with a resistance of the input resistor so that the operational amplifier has a predetermined amplification factor.

According to another aspect of the present invention, a sensor signal processing system includes an angular velocity sensor and a detector for processing an output signal from the angular velocity sensor so as to output a detection signal. At least a part of the detector is made up of a semiconductor integrated circuit, the semiconductor integrated circuit includes a driving circuit for driving the angular velocity sensor to generate a reference vibration, an AC amplifier for amplifying an output signal from the angular velocity sensor, a detection circuit for detecting an output signal from the AC amplifier so as to produce an angular velocity signal that corresponds to an angular velocity applied to the angular velocity sensor, and an amplifier circuit including an operational amplifier for amplifying an output signal from the detection circuit so as to output the detection signal, an input resistor that is connected to an input terminal of the operational amplifier includes an internal input resistor made up of a semiconductor integrated circuit element and an external input resistor disposed outside the semiconductor integrated circuit and connected to the internal input resistor in parallel, and temperature characteristics of the angular velocity sensor are compensated by temperature characteristics that are combination of temperature characteristics of the internal input resistor and temperature characteristics of the external input resistor.

Preferably, a feedback resistor is connected between an output terminal and the input terminal of the operational amplifier and is disposed outside the semiconductor integrated circuit, and an amplification factor of the operational amplifier is adjusted by a resistance of the feedback resistor so that the detection signal becomes a value corresponding to the angular velocity.

If needed, the driving circuit is provided with a limiting resistor made up of a semiconductor integrated circuit element for limiting drive current that is supplied to the angular velocity sensor, and the limiting resistor is disposed in series with a drive electrode of the angular velocity sensor.

The AC amplifier is provided with a termination resistor made up of a semiconductor integrated circuit element, and the termination resistor is connected to the input terminals to be a load on an output signal from the angular velocity sensor.

A detector according to the present invention is a detector for an angular velocity sensor system that processes an output signal from an angular velocity sensor so as to output a detection signal. At least a part of the detector is made up of a semiconductor integrated circuit, the semiconductor integrated circuit includes a driving circuit for driving the angular velocity sensor to generate a reference vibration, an AC amplifier for amplifying an output signal from the angular velocity sensor, a detection circuit for detecting an output signal from the AC amplifier and producing an angular velocity signal that corresponds to an angular velocity applied to the angular velocity sensor, and an amplifier circuit including an operational amplifier for amplifying an output signal from the detection circuit so as to output the detection signal, and connection terminals are provided so that an external input resistor that is independent of the semiconductor integrated circuit can be connected in parallel to an internal input resistor that is connected to an input terminal of the operational amplifier and is made up of a semiconductor integrated circuit element.

DESCRIPTION OF THE PREFERRED EMBODIMENTS

Hereinafter, the present invention will be explained more in detail with reference to embodiments and drawings.

First Embodiment

Figure 1:
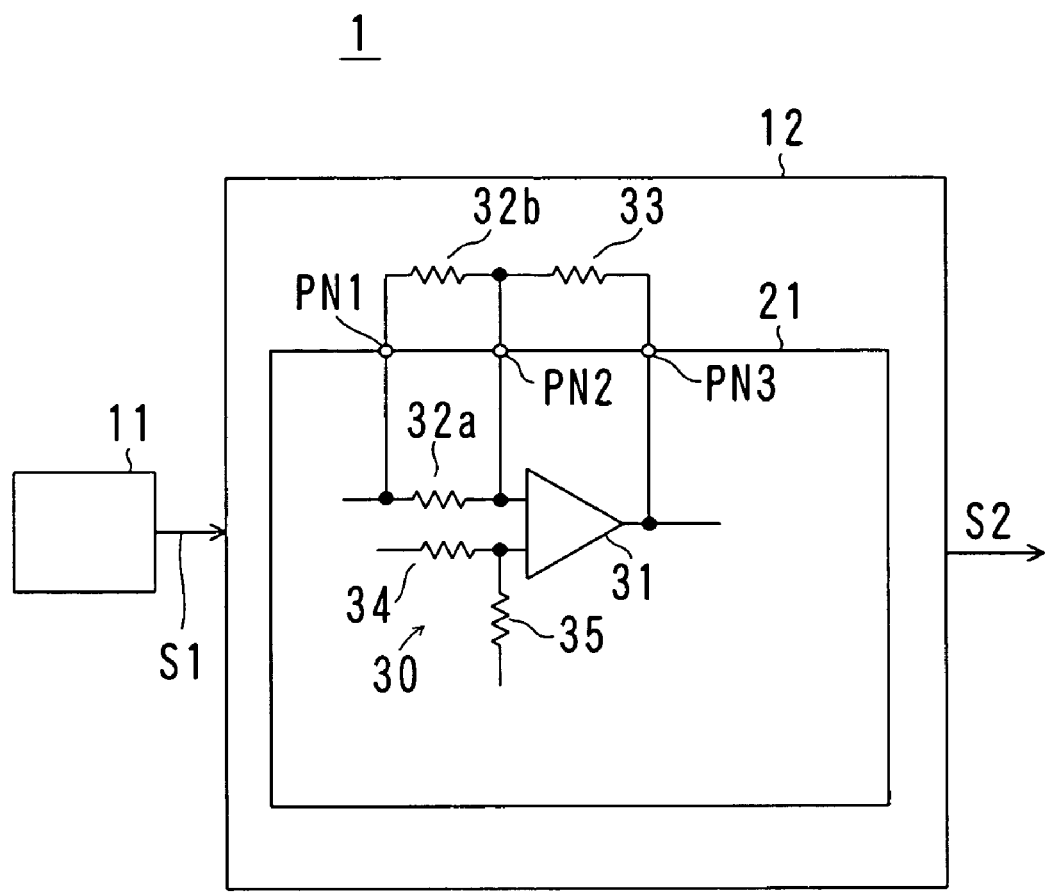
FIG. 1 is a diagram showing a configuration of a sensor signal processing system according to a first embodiment.
Figure 2:
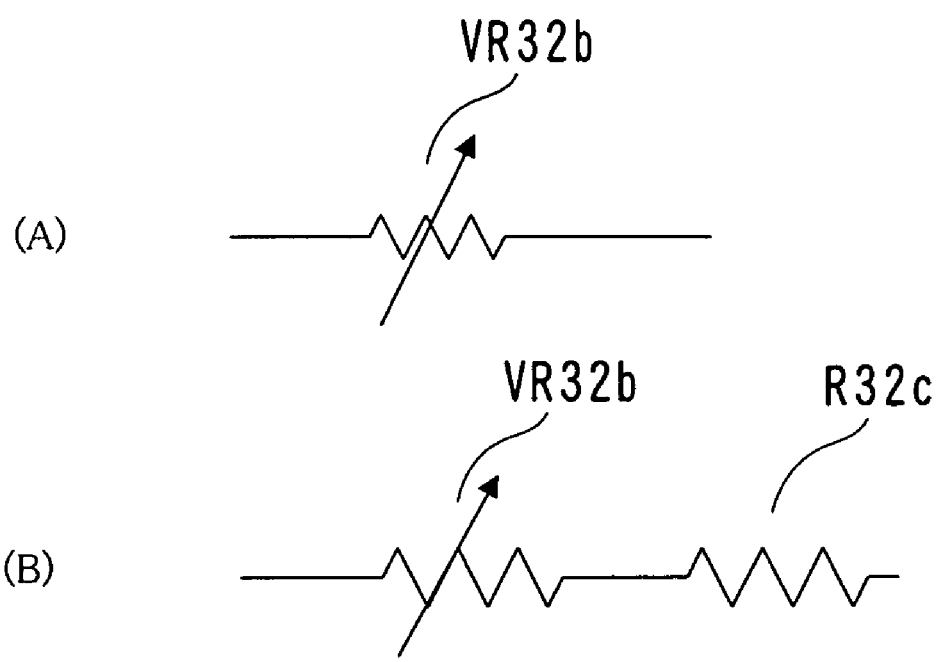
FIG. 2 is a diagram showing a configuration in which a variable resistor is used as an external input resistor.

FIG. 1 is a diagram showing a configuration of a sensor signal processing system 1 according to a first embodiment of the present invention, and FIG. 2 is a diagram showing a configuration in which a variable resistor is used as an external input resistor.

As shown in FIG. 1, the sensor signal processing system 1 includes a sensor 11 and a detector 12. The sensor 11 converts a physical phenomenon into an electric signal, which is an output signal S1. The sensor 11 can be an angular velocity sensor, a speed sensor, a position sensor, a temperature sensor, a humidity sensor, a magnetic sensor, an optical sensor, a flow rate sensor or other various sensors, for example. In any case, the signal S1 of the sensor 11 varies in accordance with temperature. In other words, the sensor 11 has sensitivity-temperature characteristics, and a temperature coefficient thereof is $\beta$. The temperature coefficient $\beta$ is a constant or is expressed by mathematical formulas or by a conversion table. However, within a practical temperature range, sensitivity and temperature have a linear relationship so that the temperature coefficient $\beta$ can be a constant in many cases.

Therefore, if the temperature coefficient $\beta$ is negative, for example, the signal S1 becomes small as temperature rises. The rate or gradient thereof is expressed by an absolute value of the temperature coefficient $\beta$. If the temperature coefficient $\beta$ is positive, the relationship between the signal S1 and temperature is opposite to the above case.

The detector 12 processes the signal S1 produced by the sensor 11 and outputs a detection signal S2 that corresponds to a physical phenomenon. The detector 12 is made up of a semiconductor integrated circuit 21 in a part and discrete components in other parts.

The semiconductor integrated circuit 21 includes a part of an amplifier circuit 30 using an operational amplifier 31 made up of semiconductor integrated circuit elements. In other words, the amplifier circuit 30 includes the operational amplifier 31 and various resistors 32-35. Note that these resistors 32-35 may be referred to as an input resistor, an internal input resistor, an external input resistor, a feedback resistor or the like corresponding to a position of connection and a function.

In the amplifier circuit 30, an internal input resistor 32a is connected between an input terminal (an inversion input terminal) of the operational amplifier 31 and an output of the front element. An external input resistor 32b is connected to the internal input resistor 32a in parallel. In addition, a feedback resistor 33 is connected between an output terminal and an input terminal of the operational amplifier 31 outside the semiconductor integrated circuit 21.

The internal input resistor 32a is disposed inside the semiconductor integrated circuit 21 and is formed when the semiconductor integrated circuit 21 is manufactured. In other words, the internal input resistor 32a is made up of the semiconductor integrated circuit element and has temperature characteristics (a temperature coefficient) of negative sign.

The external input resistor 32b and the feedback resistor 33 are discrete components that are disposed outside the semiconductor integrated circuit 21 and connected to connection terminals PN1-PN3 of the semiconductor integrated circuit 21. The external input resistor 32b and the feedback resistor 33 can be a metal-film resistor, a carbon-film resistor, a wire-wound resistor or the like, for example.

The internal input resistor 32a and the external input resistor 32b connected to each other in parallel make up the input resistor 32 of the operational amplifier 31. Therefore, a resistance of the input resistor 32 (an input resistance) is a combined resistance of the internal input resistor 32a and the external input resistor 32b connected in parallel. A temperature coefficient of the input resistor 32 also has a combined value of the internal input resistor 32a and the external input resistor 32b connected in parallel.

As an example of a specific value, the temperature coefficient of the internal input resistor 32a is −1300 ppm/° C., for example. This value is common to most elements that are formed in the semiconductor integrated circuit 21. A temperature coefficient of the external input resistor 32b is approximately ±5 ppm/° C., for example. Since an absolute vale thereof is much smaller than that of the internal input resistor 32a, the temperature coefficient can be regarded as zero approximately.

When the external input resistor 32b is connected to the internal input resistor 32a in parallel, the input resistance of the operational amplifier 31 as well as an absolute value of the temperature coefficient becomes smaller than the case where only the internal input resistor 32a is connected. Accordingly, a combined temperature coefficient, i.e., a temperature coefficient of the input resistor 32 can be adjusted by selecting a resistance of the external input resistor 32b.

When a resistance of the internal input resistor 32a is RR1 k$\Omega$, a temperature coefficient of the same is $\alpha$1, a resistance of the external input resistor 32b is RR2 k$\Omega$, and a temperature coefficient of the same is $\alpha$2, a combined resistance RR3 and a combined temperature coefficient $\alpha$3 are expressed by the following equations (1) and (2), respectively.

$$RR3=(RR1 \times RR2)/(RR1+RR2) \quad (1)$$

$$\alpha 3=[(RR2 \times \alpha 1)+(RR1 \times \alpha 2)]/(RR1+RR2) \quad (2)$$

If the temperature coefficient $\alpha$2 of the external input resistor 32b is "0", the above equation (2) can be rewritten like the following equation (3).

$$\alpha 3=(RR2 \times \alpha 1)/(RR1+RR2) \quad (3)$$

In accordance with this equation (3), the combined temperature coefficient $\alpha$3 is [(RR2)/(RR1+RR2)] times the temperature coefficient $\alpha$1 of the internal input resistor 32a, i.e., (RR2)/(RR1+RR2) times the temperature coefficient $\alpha$1. Therefore, the smaller the resistance RR2 of the external input resistor 32b becomes, the smaller an absolute value of the combined temperature coefficient $\alpha$3 becomes. In other words, the combined temperature coefficient $\alpha$3, i.e., the temperature coefficient $\alpha$3 of the input resistor 32 of the operational amplifier 31 can be adjusted by the resistance RR2 of the external input resistor 32b.

It is supposed that the resistance RR1 of the internal input resistor 32a is 200, i.e., the internal input resistor 32a has a resistance of 200 k$\Omega$ and the temperature coefficient a1 thereof is −1300 ppm/° C. In this case, the temperature coefficient $\alpha$3 is derived from the following equation (4) that is a transformation of the above equation (3).

$$\alpha 3=-(1300 \times RR2)/(200+RR2) \quad (4)$$

Therefore, if the external input resistor 32b has a resistance of 20 k$\Omega$, 200 k$\Omega$ or 2 M$\Omega$ for example, the combined temperature coefficient $\alpha$3 becomes −118 ppm/° C., −650 ppm/° C. or −1181 ppm/° C., respectively.

In this way, the resistance RR2 of the external input resistor 32b is selected so that the combined temperature coefficient $\alpha$3 has a sign opposite to that of the temperature coefficient $\beta$ of the sensor 11 and the equal or near absolute value to the same. Thus, the sensitivity-temperature characteristics of the sensor 11 can be compensated. In other words, the sensitivity-temperature characteristics of the sensor 11 are selected to have a value "0" or approximately "0", so as to obtain the detection signal S2 having good accuracy and little error due to a change of temperature.

If it is difficult to correct the temperature coefficient $\beta$ of the sensor 11 only by the temperature coefficient $\alpha$3, other compensation circuit may be combined.

In addition, an amplification factor A of the operational amplifier 31 is determined according to a resistance RR3 of the input resistor 32 and a resistance RR4 of the feedback resistor 33. Therefore, the resistance RR4 of the feedback resistor 33 is selected corresponding to the resistance RR3 of the input resistor 32 so that the amplification factor A becomes a predetermined value.

Accordingly, in order to make the amplification factor A of the amplifier circuit 30 ten times larger for example, the resistance RR4 should be ten times larger than the resistance RR3. Note that the amplification factor A is expressed in an absolute value. Therefore, if the resistance RR2 of the external input resistor 32b is changed, the resistance RR3 of the feedback resistor 33 is also changed.

In order to change the resistance RR2 of the external input resistor 32b, the external input resistor 32b may be replaced. In other words, replacement of the external input resistor 32b is performed. In addition, for example, a variable resistor VR32b may be used as the external input resistor 32b as shown in FIG. 2(A), or a variable resistor VR32b and a fixed resistor R32c connected with each other in series may be used as shown in FIG. 2(B).

In addition, a variable resistor as shown in FIG. 2 can be used as the feedback resistor 33 too for changing the amplification factor A.

Furthermore, the amplification factor A is determined in accordance with the entire sensitivity of the semiconductor integrated circuit 21, an output signal level thereof and the like. For example, the amplification factor A of the amplifier circuit 30 is determined so that the detection signal S2 becomes a capable value corresponding to the physical phenomenon with reference to the signal S1 of the sensor 11 or fits to an interface standard about communication of various signals. Note that an adjuster using a variable resistor is provided usually for adjusting the entire sensitivity and the output signal level at a stage of the detector 12.

Therefore, the amplification factor A of the amplifier circuit 30 may be determined by cooperation with the adjuster.

Second Embodiment

Next, a sensor signal processing system 1B according to a second embodiment of the present invention will be described. The sensor signal processing system 1B utilizes an angular velocity sensor (a gyro sensor) as the sensor, which outputs a detection signal corresponding to an angular velocity of an object. Therefore, the sensor signal processing system 1B can be called an angular velocity sensor system, an angular velocity detection device, a gyro sensor system, a gyro sensor or the like.

Note that description will be omitted or simplified about elements in the second embodiment having the same functions or actions as in the first embodiment.

Figure 3:
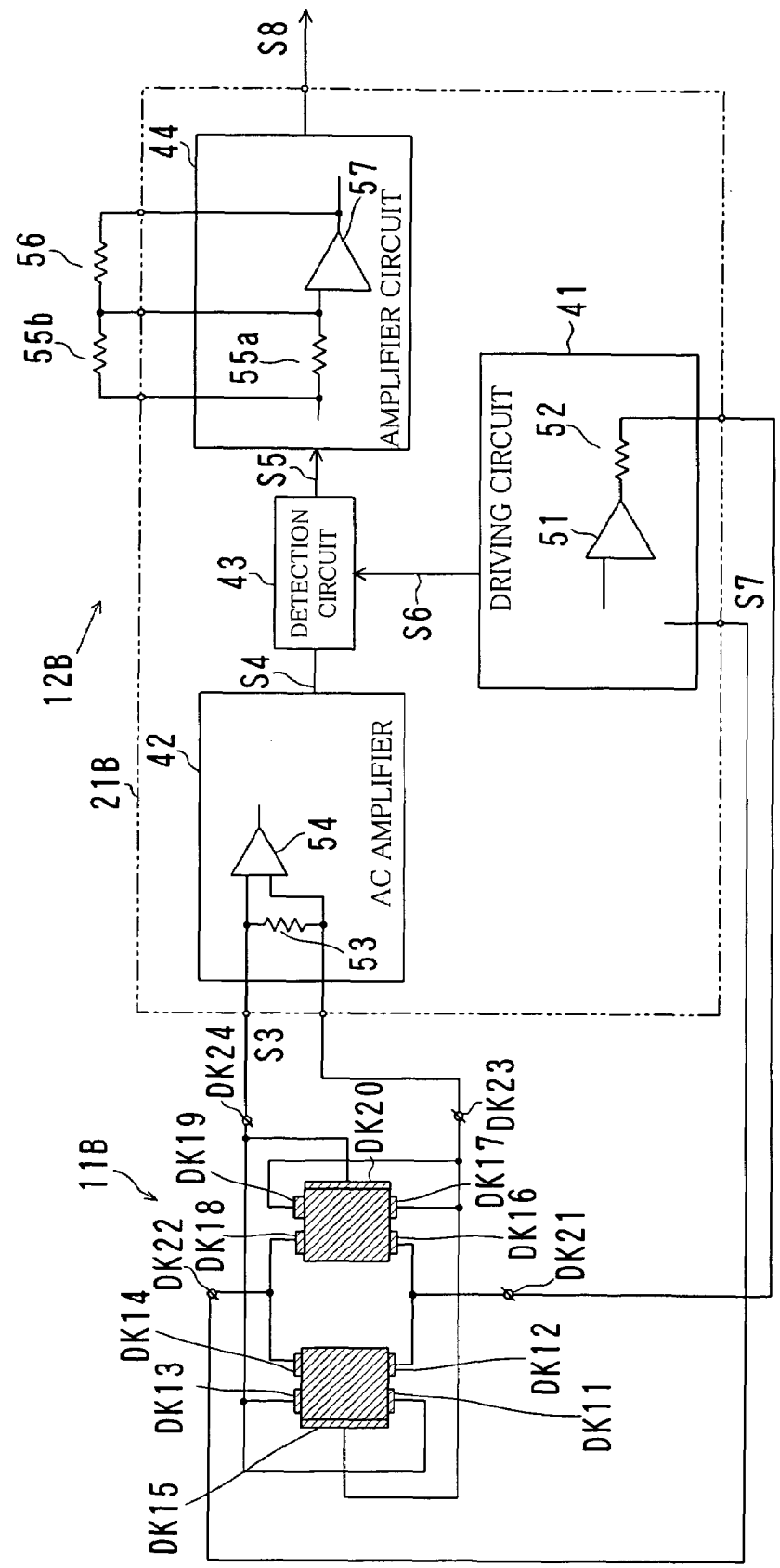
FIG. 3 is a diagram showing a configuration of a sensor signal processing system according to a second embodiment.
Figure 4:
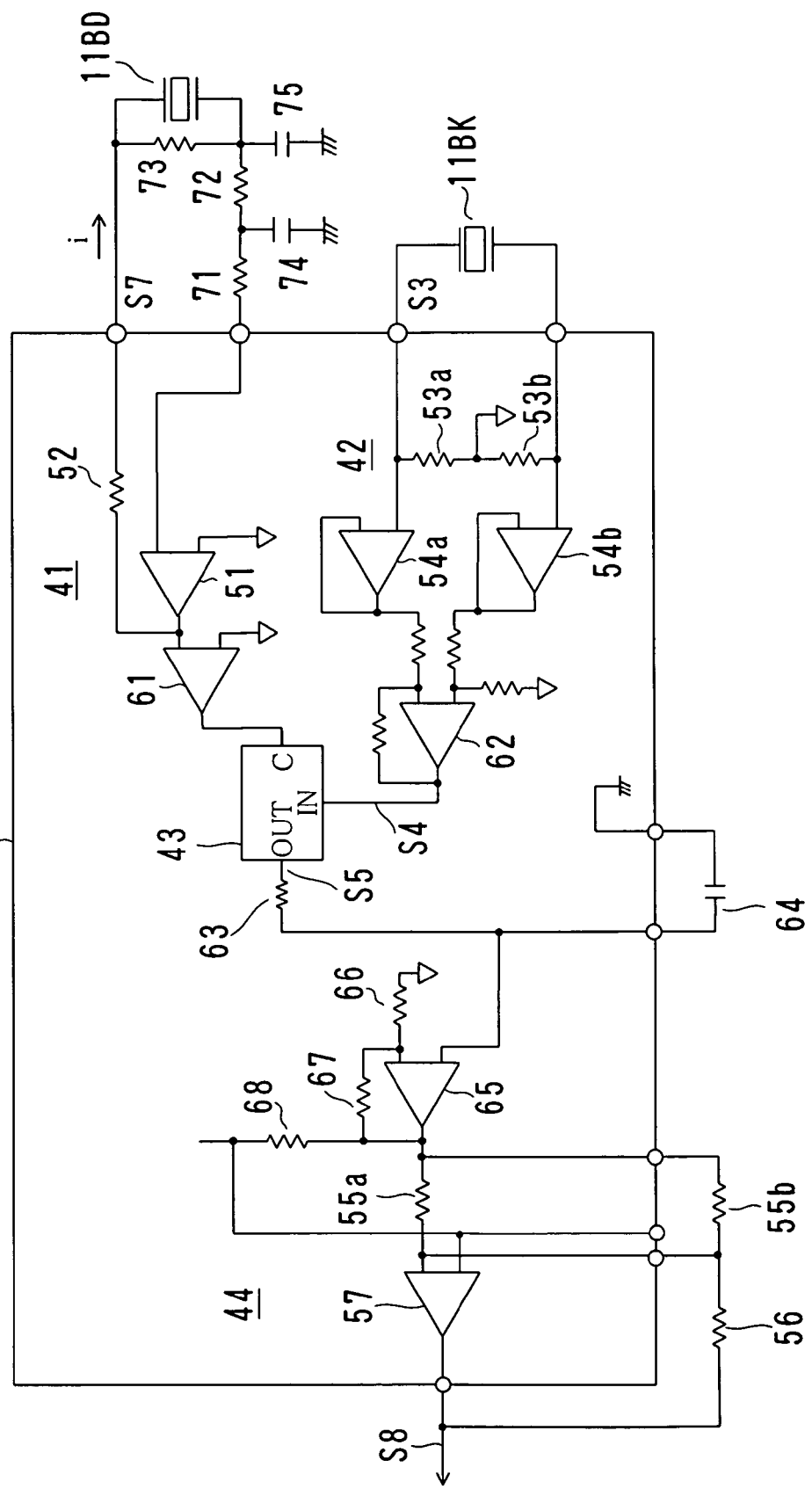
FIG. 4 is a circuit diagram showing a concrete example of a semiconductor integrated circuit.
Figure 5:
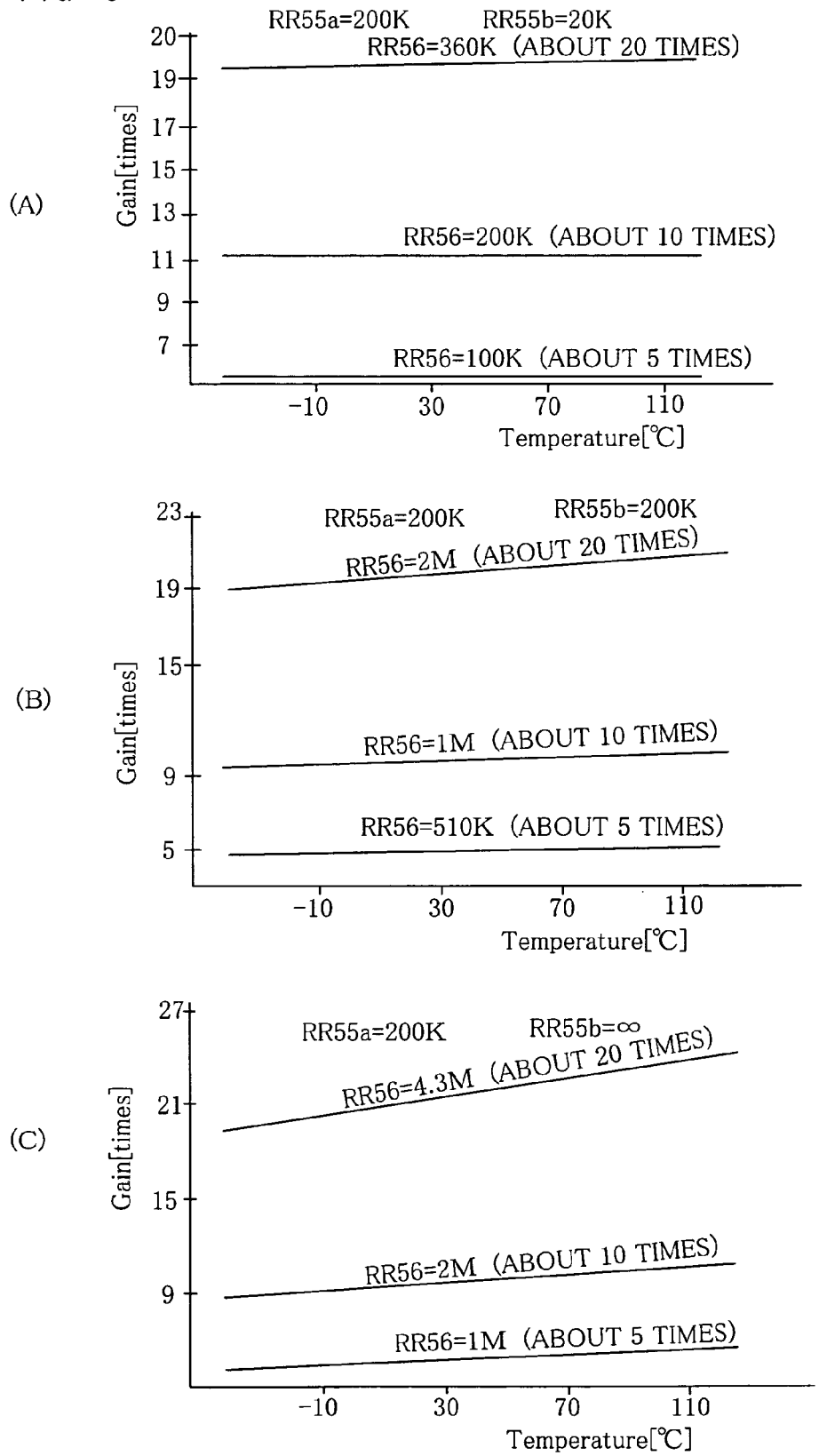
FIG. 5 is a diagram showing an example of a relationship between an external input resistor and amplification factor-temperature characteristics of an operational amplifier.
Figure 6:
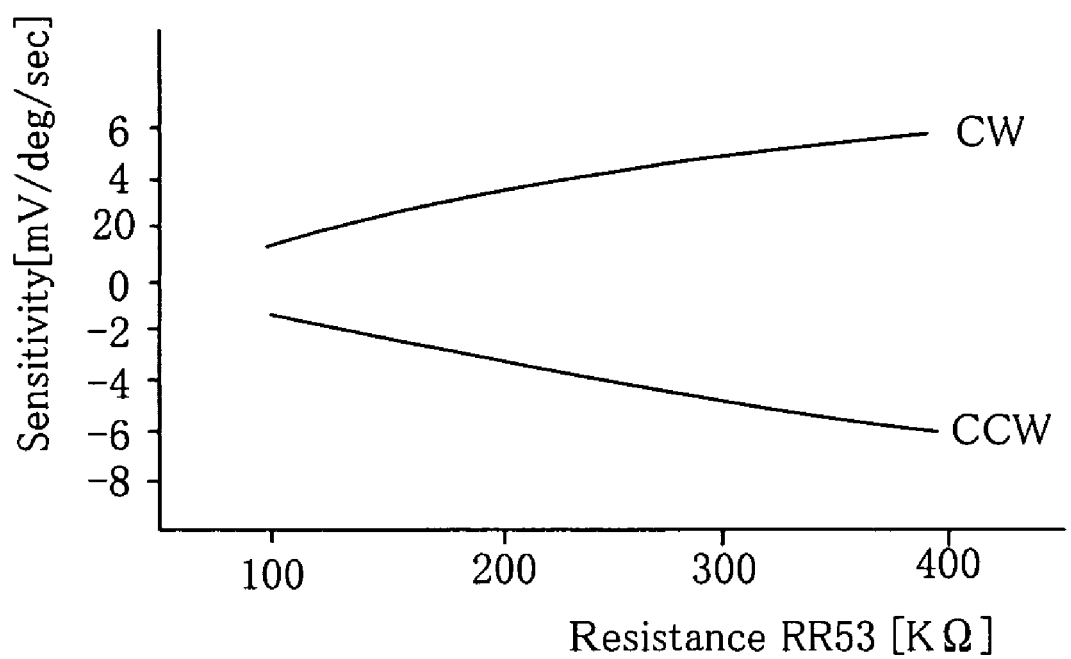
FIG. 6 is a diagram showing an example of a relationship between a resistance of an input resistor and sensitivity in an AC amplifier.
Figure 7:
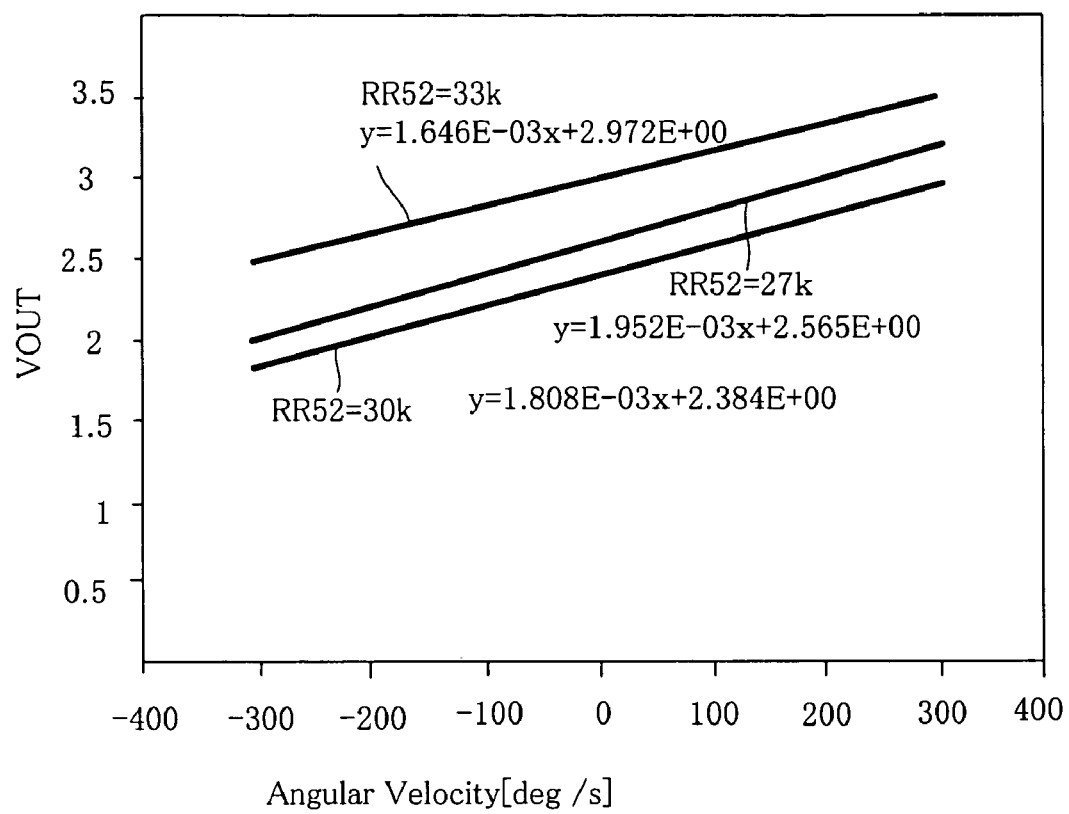
FIG. 7 is a diagram showing a relationship between a resistance of a limiting resistor and an output voltage in a driving circuit.
Figure 8:
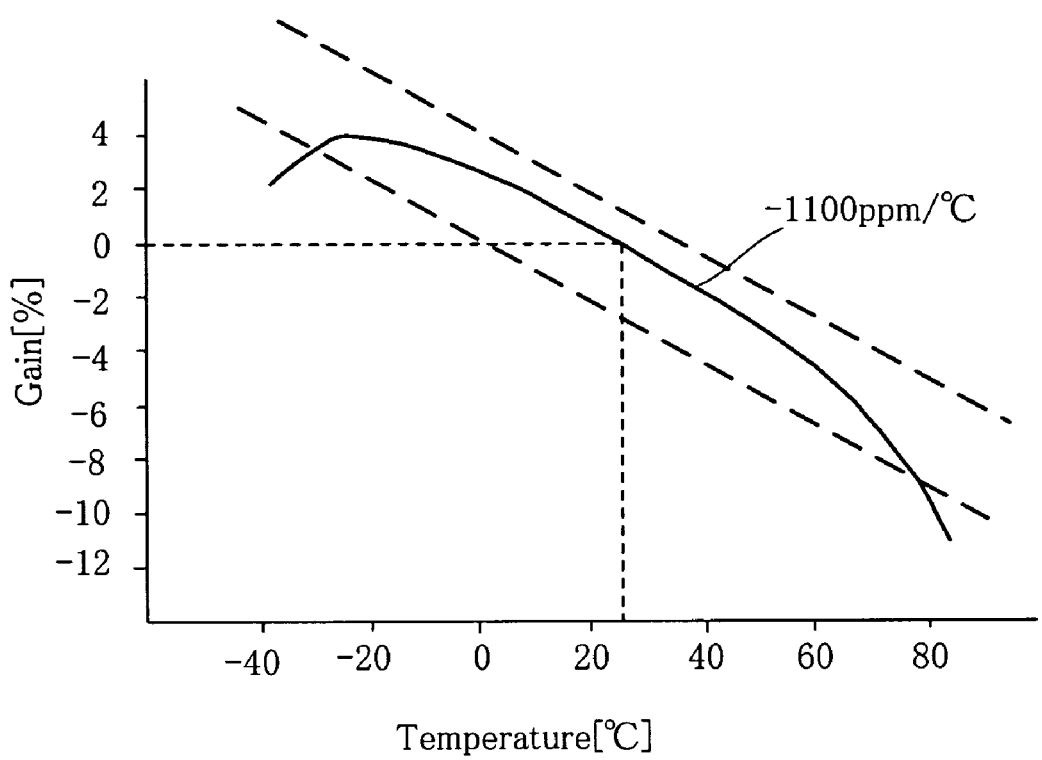
FIG. 8 is a diagram showing an example of sensitivity-temperature characteristics of an angular velocity sensor.

FIG. 3 is a diagram showing a configuration of the sensor signal processing system 1B according to the second embodiment of the present invention, FIG. 4 is a circuit diagram showing a concrete example of a semiconductor integrated circuit 21B, FIG. 5 is a diagram showing an example of a relationship between a resistance RR55b of an external input resistor 55b and amplification factor-temperature characteristics of an operational amplifier 57 in an amplifier circuit 44, FIG. 6 is a diagram showing an example of a relationship between a resistance RR53 of an input resistor 53 and sensitivity in an AC amplifier 42, FIG. 7 is a diagram showing a relationship between a resistance RR52 of the limiting resistor 52 and an output voltage in a driving circuit 41 when the resistance RR52 is altered, and FIG. 8 is a diagram showing an example of sensitivity-temperature characteristics of an angular velocity sensor 11B.

As shown in FIG. 3, the sensor signal processing system 1B includes the angular velocity sensor 11B and a detector 12B.

The angular velocity sensor 11B is a tuning fork gyro sensor including a tuning fork oscillator made of a piezoelectric material such as a lithium niobate (LN) and a plurality of electrodes DK for drive and detection formed on front, rear and side faces of the tuning fork oscillator. When a drive voltage is applied between the electrodes DK21 and DK22 for supplying drive current, the angular velocity sensor 11B generates a reference vibration. In this state, if an angular velocity is applied to the angular velocity sensor 11B, a signal S3 corresponding to the angular velocity is output between the electrodes DK23 and DK24.

As shown in FIG. 8, the angular velocity sensor 11B has sensitivity-temperature characteristics that sensitivity drops as temperature rises. In the example shown in FIG. 8, sensitivity-temperature characteristics of the angular velocity sensor 11B do not always show a linear variation at the middle portion, and there are individual differences. In this embodiment, however, it is supposed that it has a constant value of −1100 ppm/° C. within a working temperature range, e.g., −20° C. to 60° C.

The detector 12B processes the signal S3 from the angular velocity sensor 11B and outputs a detection signal S8 corresponding to the angular velocity. The detector 12B is made up of a semiconductor integrated circuit 21B in a part and discrete components or the like in other parts.

The semiconductor integrated circuit 21B includes a driving circuit 41, an AC amplifier 42, a detection circuit 43 and a part of an amplifier circuit 44.

The driving circuit 41 drives an angular velocity sensor 11B so that the angular velocity sensor 11B generates the reference vibration. Therefore, the driving circuit 41 includes a final amplifier 51 for exciting the angular velocity sensor 11B and a limiting resistor 52 for limiting drive current i that flows in the angular velocity sensor 11B by the final amplifier 51. The limiting resistor 52, which is inside the semiconductor integrated circuit 21B and is made up of the semiconductor integrated circuit element, has a negative temperature coefficient as described above. The limiting resistor 52 is connected to the electrodes DK21 and DK22 of the angular velocity sensor 11B in series. Known components are used for other parts of the driving circuit 41 except for the part related to the limiting resistor 52.

The AC amplifier 42 amplifies the signal S3 from the angular velocity sensor 11B and outputs a signal S4. The AC amplifier 42 is provided with an input resistor 53 that is a load on the signal S3 of the angular velocity sensor 11B, a differential amplifier 54 that amplifies a voltage generated across the terminals of the input resistor 53 and the like. The input resistor 53 is made up of the same semiconductor integrated circuit element and has a negative temperature coefficient. The input resistor 53 may be referred to as a "termination resistor". Known components are used for other parts of the AC amplifier 42 except for the part related to the input resistor 53.

The detection circuit 43 detects a signal S4 that is output from the AC amplifier 42 and produces an angular velocity signal S5 that corresponds to the angular velocity applied to the angular velocity sensor 11B. Known components are used for the detection circuit 43 itself.

The amplifier circuit 44 amplifies the angular velocity signal S5 that is output from the detection circuit 43 and outputs a detection signal S8. The amplifier circuit 44 includes an internal input resistor 55a, an external input resistor 55b, a feedback resistor 56 and an operational amplifier 57.

In the amplifier circuit 44, similarly to the amplifier circuit 30 in the sensor signal processing system 1 of the first embodiment, the input resistor 55 of the operational amplifier 57 is made up of the internal input resistor 55a and the external input resistor 55b connected to each other in parallel. The internal input resistor 55a is made up of a semiconductor integrated circuit element and has a negative temperature coefficient. The external input resistor 55b and the feedback resistor 56 are discrete components disposed outside the semiconductor integrated circuit 21B, and temperature coefficients of these can be regarded as "0" with respect to that of the internal input resistor 55a.

As shown in FIG. 4, an output of the final amplifier 51 in the driving circuit 41 is applied to a vibration electrode 11BD of the angular velocity sensor 11B via the limiting resistor 52. The vibration electrode 11BD constitutes a vibration circuit together with a phase circuit made up of resistors 71-73, capacitors 74-75 and the like.

An output signal of the detection electrode 11BK of the angular velocity sensor 11B in the AC amplifier 42, whose load is the input resistor 53 made up of two resistors 53a and 53b connected to each other in series, is amplified by the differential amplifier circuit made up of two amplifiers 54a and 54b. The signal is further amplified by the amplifier 62, and an output signal S4 of the amplifier 62 becomes an input to the detection circuit 43.

An output signal S5 of the detection circuit 43 enters a first amplifier 65 of the amplifier circuit 44 via a smoothing circuit made up of a resistor 63 and a capacitor 64. An output of the first amplifier 65 enters the operational amplifier 57 from the inversion input terminal via the input resistor 55. The operational amplifier 57 amplifies the input signal with an amplification factor A that is determined by a resistance RR of the internal input resistor 55a and the external input resistor 55b connected to each other in parallel and a resistance RR of the feedback resistor 56, and a detection signal S8 is produced.

Next, an operation of the sensor signal processing system 1B will be described.

The temperature coefficient α of the input resistor 55 in the amplifier circuit 44 can be adjusted by the resistance RR of the external input resistor 55b in the same way as in the first embodiment. Therefore, it is possible to compensate the sensitivity-temperature characteristics of the angular velocity sensor 11B.

FIG. 5 shows an example of a relationship between a resistance RR55b of the external input resistor 55b and sensitivity-temperature characteristics of the operational amplifier 57 in the amplifier circuit 44. More specifically, FIG. 5 shows temperature variations of the amplification factor A in cases where a resistance RR55a of the internal input resistor 55a is set to 200 kΩ, a resistance RR55b of the external input resistor 55b is set to 20 kΩ as shown in FIG. 5(A) or 200 kΩ as shown in FIG. 5(B) or infinite value (open) as shown in FIG. 5(C), and a resistance RR56 of the feedback resistor 56 is set to a value such that the amplification factor A becomes approximately five, ten or twenty times in each case.

As shown in FIG. 5, there is a general tendency that the amplification factor A increases as temperature rises. Under this situation, if the resistance RR55b of the external input resistor 55b is decreased, a rate of the temperature variation of the amplification factor A becomes small.

When the resistance RR55b of the external input resistor 55b is selected approximately, sensitivity-temperature characteristics of the operational amplifier 57 can be set to any desired characteristics. In addition, an amplification factor A of the operational amplifier 57 can be set to any desired value at the same time by selecting the resistance RR56 of the feedback resistor 56 approximately.

In addition, when a resistance RR53 of the input resistor 53 is decreased in the AC amplifier 42, a resistance of load viewed from the angular velocity sensor 11B is reduced, so that an output voltage of the angular velocity sensor 11B decreases. Therefore, an output level of the differential amplifier 54 decreases.

More specifically, as shown in FIG. 6, the sensitivity increases in accordance with the resistance RR53 of the input resistor 53 in either direction of clockwise (CW) or counter clockwise (CCW) of the angular velocity sensor 11B. Note that the resistance RR53 is usually set to a value of approximately 200 kΩ. In FIG. 6, the sensitivity of the angular velocity sensor 11B depends on an applied voltage, and Vcc=5V in this embodiment.

In addition, the input resistor 53 has a negative temperature coefficient, and the value thereof is −1300 ppm/° C. in this embodiment. Therefore, the amplification factor A of the differential amplifier 54 also has negative temperature characteristics under the influence thereof. In order to reduce or cancel this influence, it is preferable to make the input resistor 53 an external resistor that is independent of the semiconductor integrated circuit 21B or to enable the input resistor 53 to be connected with an external resistor in parallel so that the temperature coefficient can be adjusted. It is preferable to provide connection terminals to the semiconductor integrated circuit 21B for connecting such an external resistor.

In the driving circuit 41, the limiting resistor 52 has a negative temperature coefficient, and the value thereof is −1300 ppm/° C. in this embodiment. In this case, tempera-ture characteristics of the drive current i that is supplied to the angular velocity sensor 11B, i.e., temperature characteristics of the entire driving circuit 41 have a positive value of 800 ppm/° C. A resistance RR52 of the limiting resistor 52 is 30 kΩ.

FIG. 7 shows a variation of the output voltage (signal S3) with respect to the angular velocity that is applied to the angular velocity sensor 11B in each case where the resistance RR52 of the limiting resistor 52 is 27 kΩ, 30 kΩ or 33 kΩ. The sensitivity of the angular velocity sensor 11B is the gradient in the graph shown in FIG. 7, which is "1.952" in the case where the resistance RR52 is 27 kΩ, "1.808" in the case where the resistance RR52 is 30 kΩ, and "1.646" in the case where the resistance RR52 is 33 kΩ.

Therefore, the larger the resistance RR52, the lower the sensitivity becomes. Accordingly, that limiting resistor 52 has a negative temperature coefficient means that the driving circuit 41 has positive temperature characteristics, which are 800 ppm/° C. in this embodiment as described above.

In order to adjust temperature characteristics of the driving circuit 41, it is preferable to adjust a resistance of the limiting resistor 52 or to make the limiting resistor 52 using an external resistor that is independent of the semiconductor integrated circuit 21B or to enable the limiting resistor 52 to be connected with an external resistor in parallel so that the temperature coefficient can be adjusted.

Next, an example will be described in which temperature characteristics of the driving circuit 41, the AC amplifier 42 and the amplifier circuit 44 are combined and used for compensating sensitivity-temperature characteristics of the angular velocity sensor 11B.

EXAMPLE 1

Only the temperature characteristics of the amplifier circuit 44 are used for the compensation. More specifically, a resistor having a resistance RR32b of 1.1 MΩ and a temperature coefficient α2 of "0" is used as the external input resistor 32b. External resistors having no temperature coefficient are used for the limiting resistor 52 of the driving circuit 41 and the input resistor 53 of the AC amplifier 42.

In this case, the combined temperature coefficient α3 becomes 1100 ppm/° C. from the above equation (4), and the temperature characteristics of the amplifier circuit 44, i.e., temperature characteristics of the entire semiconductor integrated circuit 21 become 1100 ppm/° C., so the sensitivity-temperature characteristics −1100 ppm/° C. of the angular velocity sensor 11B are canceled.

Together with the setting of the resistance RR32b to 1.1 MΩ, the feedback resistor 33 is adjusted so that the amplification factor A of the amplifier circuit 44 becomes a predetermined value.

EXAMPLE 2

The temperature characteristics of the amplifier circuit 44 and the temperature characteristics of the driving circuit 41 are both used for the compensation. More specifically, the limiting resistor 52 of the driving circuit 41 is made up of a semiconductor integrated circuit element, and the temperature characteristics of the driving circuit 41 are set to a value of 800 ppm/° C. as described above. Furthermore, a resistor having a resistance RR32b of 60 kΩ and a temperature coefficient α2 of "0" is used for the external input resistor 32b of the amplifier circuit 44. An external resistor having no temperature coefficient is used for the input resistor 53 of the AC amplifier 42.

In this case, the combined temperature coefficient α3 in the amplifier circuit 44, i.e., temperature characteristics of the amplifier circuit 44 become 300 ppm/° C. from the above equation (4). Therefore, temperature characteristics of the entire semiconductor integrated circuit 21 become 800+ 300=1100 ppm/° C., so that the sensitivity-temperature characteristics −1100 ppm/° C. of the angular velocity sensor 11B can be cancelled.

EXAMPLE 3

In Example 3, it is supposed that the sensitivity-temperature characteristics of the angular velocity sensor 11B is a positive value 1000 ppm/° C. In this case, temperature characteristics of the AC amplifier 42 are used for the compensation. More specifically, the input resistor 53 is made up of a semiconductor integrated circuit element, and the temperature characteristics is set to a value of −1300 ppm/° C. Thus, if the temperature characteristics of the AC amplifier 42 become approximately 1100 ppm/° C., 1000 ppm/° C. of the angular velocity sensor 11B is substantially canceled.

Furthermore, various combinations of positive and negative temperature characteristics of the driving circuit 41, the AC amplifier 42 and the amplifier circuit 44 can be used for setting the temperature characteristics of the entire semiconductor integrated circuit 21 appropriately, so that the sensitivity-temperature characteristics of the angular velocity sensor 11B can be canceled or reduced for performing the compensation.

Further, since temperature characteristics can be adjusted finely only by selecting and adding a resistance of the external input resistor 32b or by selecting the limiting resistor 52 and the input resistor 53, its configuration is simple without a large-scale circuit. Therefore, it is possible to support various angular velocity sensors 11B by increasing the correction coefficient of the temperature characteristics.

In each embodiment described above, a resistor having a positive or negative temperature coefficient α and various values can be used for the external input resistor 32b or the external input resistor 55b. The semiconductor integrated circuits 21 and 21B may be housed in an appropriate package. As the external connection terminals, various terminals that can be soldered or pin terminals that can be connected to a socket or a connector can be used. As for the detector 12 or 12B, an appropriate printed circuit board or the like may be used, and the semiconductor integrated circuit 21 or 21B, the external resistor and other components may be mounted thereon.

In the above-described embodiment, a ceramic, a crystal or other various materials can be used for the angular velocity sensor 11B. The external input resistor 32b or the like may be adjusted in accordance with the temperature characteristics thereof.

Furthermore, the structure, the shape, the dimension, the number, the circuit, the resistance, the constants and the like of a whole or a part of the driving circuit 41, the AC amplifier 42, the detection circuit 43, the amplifier circuit 44, the detectors 12 and 12B or the sensor signal processing systems 1 and 1B can be modified if necessary in accordance with the spirit of the present invention.

While example embodiments of the present invention have been shown and described, it will be understood that the present invention is not limited thereto, and that various changes and modifications may be made by those skilled in the art without departing from the scope of the invention as set forth in the appended claims and their equivalents.

What is claimed is:

1. A sensor signal processing system comprising a sensor and a detector for processing an output signal from the sensor so as to output a detection signal that corresponds to a physical phenomenon, wherein:
    a whole or part of the detector is made up of a semiconductor integrated circuit,
    the semiconductor integrated circuit includes an operational amplifier made up of a semiconductor integrated circuit element,
    an input terminal of the operational amplifier is connected to an internal input resistor that is inside the semiconductor integrated circuit, formed in a manufacturing process of the semiconductor integrated circuit, and made up of the semiconductor integrated circuit element having temperature characteristics unique to the semiconductor integrated circuit;
    the semiconductor integrated circuit is provided with at least two connection terminals for connecting both ends of an external input resistor that is made of a discrete component and has temperature characteristics of substantially zero with respect to the temperature characteristics of the internal input resistor, both ends of the internal input resistor being connected to the two connection terminals, the both ends of the external input resistor being connected to the two connection terminals; and
    sensitivity-temperature characteristics of the sensor are compensated by temperature characteristics that are a combination of temperature characteristics of the internal input resistor and temperature characteristics of the external input resistor.

2. The sensor signal processing system according to claim 1, wherein the different connection terminal is connected to a feedback resistor for feedback from the output terminal to the input terminal of the operational amplifier and is disposed outside the semiconductor integrated circuit, and
    a resistance of the feedback resistor is set in accordance with a resistance of the input resistor so that the operational amplifier has a predetermined amplification factor.

3. A sensor signal processing system comprising an angular velocity sensor and a detector for processing an output signal from the angular velocity sensor so as to output a detection signal, wherein:
    a whole or part of the detector is made up of a semiconductor integrated circuit,
    the semiconductor integrated circuit includes:
    a driving circuit for driving the angular velocity sensor to generate a reference vibration,
    an AC amplifier for amplifying an output signal from the angular velocity sensor,
    a detection circuit for detecting an output signal from the AC amplifier so as to produce an angular velocity signal that corresponds to an angular velocity applied to the angular velocity sensor, and
    a part of an amplifier circuit including an operational amplifier for amplifying an output signal from the detection circuit so as to output the detection signal,
    an input terminal of the operational amplifier is connected to an internal input resistor that is inside the semiconductor integrated circuit, formed in a manufacturing process of the semiconductor integrated circuit, and made up of the semiconductor integrated circuit element having temperature characteristics unique to the semiconductor integrated circuit;

the semiconductor integrated circuit is provided with at least two connection terminals for connecting both ends of an external input resistor that is made of a discrete component and has temperature characteristics of substantially zero with respect to the temperature characteristics of the internal input resistor, both ends of the internal input resistor being connected to the two connection terminals, the both ends of the external input resistor being connected to the two connection terminals; and temperature characteristics of the angular velocity sensor are compensated by temperature characteristics that are a combination of temperature characteristics of the internal input resistor and temperature characteristics of the external input resistor.

4. The sensor signal processing system according to claim 3, wherein:

the semiconductor integrated circuit is provided with a different connection terminal that is connected to an output terminal of the operational amplifier and employed to externally connect a resistor made of a discrete component, and the different connection terminal is connected to a feedback resistor for feedback from the output terminal to the input terminal of the operational amplifier and is disposed outside the semiconductor integrated circuit, and an amplification factor of the operational amplifier is adjusted by a resistance of the feedback resistor so that the detection signal becomes a value corresponding to the angular velocity.

5. The sensor signal processing system according to claim 3, wherein the driving circuit is provided with a limiting resistor that is made up of a semiconductor integrated circuit element having temperature characteristics unique to the semiconductor integrated circuit and is operable to limit drive current that is supplied to the angular velocity sensor, and the limiting resistor is disposed in series with a drive electrode of the angular velocity sensor.

6. The sensor signal processing system according to claim 3, wherein the AC amplifier is provided with a termination resistor made up of a semiconductor integrated circuit element having temperature characteristics unique to the semiconductor integrated circuit, and the termination resistor is connected to the input terminals to be a load on an output signal from the angular velocity sensor.

7. The sensor signal processing system according to claim 1, wherein the semiconductor integrated circuit is provided with a different connection terminal that is connected to an output terminal of the operational amplifier and employed to externally connect a resistor made of a discrete component.

8. A method of signal processing, comprising:

providing an angular velocity sensor;

making a whole or a part of a detector from a semiconductor integrated circuit;

processing an output signal from the angular velocity sensor;

providing a driving circuit for driving the angular velocity sensor to generate a reference vibration in the semiconductor integrated circuit, providing an AC amplifier in the semiconductor integrated circuit for amplifying the output signal from the angular velocity sensor, providing a detection circuit for detecting an output signal from the AC amplifier so as to produce an angular velocity signal that corresponds to an angular velocity applied to the angular velocity sensor in the semiconductor integrated circuit, providing a part of an amplifier circuit including an operational amplifier for amplifying an output signal from the detection circuit in the semiconductor integrated circuit;

forming an internal input resistor having temperature characteristics unique to the semiconductor integrated circuit during a manufacturing process of the semiconductor integrated circuit;

connecting an input terminal of the operational amplifier to the internal input resistor;

providing an external input resistor having temperature characteristics of substantially zero relative to the temperature characteristics of the internal input resistor as a discrete component;

providing the semiconductor integrated circuit with at least two connection terminals;

connecting both ends of the internal input resistor to the two connection terminals;

connecting both ends of the external input resistor to the two connection terminals; and compensating for temperature characteristics of the angular velocity sensor by combining the temperature characteristics of the internal input resistor and the temperature characteristics of the external input resistor.

* * * * *